(12) United States Patent
Nishiyama

(10) Patent No.: US 8,790,011 B2
(45) Date of Patent: Jul. 29, 2014

(54) SEAL DEVICE AND LINEAR GUIDE DEVICE

(75) Inventor: Kazuhito Nishiyama, Maebashi (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 13/881,323

(22) PCT Filed: Sep. 14, 2011

(86) PCT No.: PCT/JP2011/005196
§ 371 (c)(1),
(2), (4) Date: Apr. 24, 2013

(87) PCT Pub. No.: WO2012/063392
PCT Pub. Date: May 18, 2012

(65) Prior Publication Data
US 2013/0223770 A1      Aug. 29, 2013

(30) Foreign Application Priority Data

Nov. 10, 2010   (JP) ................................ 2010-252222

(51) Int. Cl.
*F16C 29/06*   (2006.01)
*F16C 33/00*   (2006.01)

(52) U.S. Cl.
USPC .............................................. 384/15; 384/43

(58) Field of Classification Search
USPC .......................................... 384/15, 43–45, 50
See application file for complete search history.

(56) References Cited

U.S. PATENT DOCUMENTS 5,149,204 A    9/1992   Tennichi

FOREIGN PATENT DOCUMENTS

| CN | 1644939 A | 7/2005 |
| CN | 101725638 A | 6/2010 |
| JP | 61-133123 U | 8/1986 |
| JP | 9-317765 A | 12/1997 |
| JP | 2007-218357 A | 8/2007 |
| JP | 2008-2492 A | 1/2008 |
| JP | 2008144875 A * | 6/2008 |
| JP | 2010169183 A * | 8/2010 |

OTHER PUBLICATIONS

International Preliminary Report on Patentability (PCT/IB/338 & PCT/IB/373) including English Translation of document C2 (Japanese-language Written Opinion (PCT/ISA/237)) previously filed on Apr. 24, 2013 (eight (8) pages).
International Search Report dated Dec. 6, 2011 including English-language translation. (Two (2) pages).
Japanese-language Written Opinion (PCT/ISA/237) dated Dec. 6, 2011. (Four (4) pages).
Chinese Office Action dated Dec. 17, 2013 with English translation (sixteen (16) pages).

* cited by examiner

*Primary Examiner* — Phillip A Johnson
(74) *Attorney, Agent, or Firm* — Crowell & Moring LLP

(57) ABSTRACT

A non-contact seal device is provided such that when attaching an end seal to a slider, positioning members can be used for positioning in the vertical and horizontal directions. Due to this, the end seal can be positioned with respect to the outer surfaces of the guide rail without using a specialized positioning fixture and then attach the end seal to the slider. Further, the projecting length of the positioning members is the same as the distance of the clearance between the guide rail and the end seal. Due to this, it becomes possible to attach the end seal to the slider so that the clearance between the guide rail and the end seal becomes the same as the distance of the clearance without using a specialized positioning fixture.

9 Claims, 4 Drawing Sheets

SEAL DEVICE AND LINEAR GUIDE DEVICE

TECHNICAL FIELD

The present invention relates to a seal device and a linear guide device having the same.

BACKGROUND ART

The linear guide device which has been used in machine tools etc. in the past has been provided with a guide rail which has rolling element rolling grooves which extend in an axial direction at its outer surfaces and with a slider which has rolling element rolling grooves which are formed facing the rolling element rolling grooves of the guide rail and which straddles the guide rail in a manner enabling relative movement.

The slider is provided with a slider body and with end caps which are joined to the two end faces of the slider body in the movement direction. At the surfaces of the end caps at the sides opposite to the slider body, end seals are attached. Refuse, dust, chips, shavings, and other foreign matter enter into the spaces which are formed between the guide rail and the slider. If depositing in the rolling element rolling grooves, smooth rolling of the rolling elements is interfered with. The end seals seal the openings of the spaces to prevent entry of foreign matter into the spaces. Due to this, good operability of the linear guide device is maintained. Further, the end seals act to suppress discharge of dust which was produced at the inside of the slider to the outside of the slider.

Therefore, to accurately prevent the entry of foreign matter into the spaces, it is necessary to position the end seals with respect to the outer surfaces of the guide rail so that the clearances between the outer surfaces of the guide rail and the facing surfaces of the end seals facing them become predetermined clearances and then attach the end seals to the slider.

As linear guide devices of configurations which position the end seals with respect to the outer surfaces of the guide rail and then attach the end seals to the slider, for example, there are the linear guide devices described in Patent Documents 1 and 2.

CITATIONS LIST

Patent Documents

Patent Document 1: JP 1997-317765 A
Patent Document 2: JP 2007-218357 A

SUMMARY OF INVENTION

Problem to be Solved

However, the linear guide device described in Patent Document 1 is provided with projections at parts coupled with the slider and uses these to position the end seals. Therefore, since there is a possibility of deviation of the mounting positions of the parts to be coupled with the slider or if deviation of positions of the projections themselves, such deviation is liable to affect positioning of the end seals and degrade the precision of positioning of the end seals.

Further, the linear guide device described in Patent Document 2 is provided with end seals with seal parts which contact the guide rail, so the end seals themselves end up being positioned along the guide rail. Furthermore, in a linear guide device which is provided with end seals of a type which contacts the guide rail, attachment of the end seals is liable to increase the frictional resistance in movement of the slider. Further, in a usage environment in which low dust production is demanded, the sliding of the contact type seals may cause dust production and make lower dust production unrealizable.

The problems of the increase in frictional resistance and dust production can be solved by using end seals which do not contact the guide rail. When attaching end seals of a type not contacting the guide rail, it is possible to insert shims of prescribed thicknesses between the guide rail and the end seals while attaching the end seals to the slider so as to adjust the clearances between the outer surfaces of the guide rail and the facing surfaces of the end seals to become prescribed values.

However, using shims each time when attaching the end seals is troublesome in terms of work, so is not preferable. Further, when the clearances between the guide rail and end seals are extremely slight, if attaching metal end seals, the end seals are liable to contact unexpected locations of the guide rail and scratch the guide rail.

The present invention is intended to solve this problem and has as its object to provide a noncontact type seal device which can be attached while being positioned with a high precision without using specialized positioning fixtures and a linear guide device which is provided with such seal devices and therefore is low in dust production and excellent in operability.

Solution to the Problem

To solve the above problem, a seal device according to one aspect of the present invention is a noncontact type seal device attached to a slider of a linear guide device with a clearance of a predetermined distance with respect to outer surfaces of the guide rail, the seal device sealing an opening part of a space which is formed between a guide rail and the slider, where the linear guide device is provided with the guide rail extending in an axial direction and the slider attached to the guide rail in a manner enabling relative movement in the axial direction, the seal device is provided with positioning parts which contact the outer surfaces of the guide rail to prevent the outer surfaces of the guide rail from contacting with the facing surfaces of the seal device which face the same when attaching the seal device to the slider which has been attached to the guide rail and which maintain the distance between the outer surfaces of the guide rail and the facing surfaces the same as the distance of the clearance while attaching them, the positioning parts comprise projections which project out from the facing surfaces, and a length of the projection from the facing surfaces is the same as the distance of the clearance.

Further, in the above seal device, the device is preferably a member which is attached to an end part of the slider in the axial direction and which seals an opening part which faces the axial direction in the opening parts of the space.

Furthermore, in the above seal device, the device is preferably a member which is attached to facing parts of the slider which face side surfaces of the guide rail having a substantially cross-sectional rectangular shape and which seals an opening part of a space which is formed between the side surfaces of the guide rail and the facing parts of the slider in the opening parts of the space.

Further, in the above seal device, the positioning parts are preferably made of a plastic.

Furthermore, the linear guide device according to another aspect of the present invention is a linear guide device provided with a guide rail extending in an axial direction, a slider attached to the guide rail in a manner enabling relative movement in the axial direction, and a noncontact type seal device attached to the slider to face the outer surfaces of the guide rail with a clearance of a predetermined distance and sealing an opening part of a space which is formed between the guide rail and the slider, where the seal device is a seal device according to any of the above aspects, the positioning parts are in contact with the outer surfaces of the guide rail to prevent the outer surfaces of the guide rail from contacting with the facing surfaces of the seal device which face the same, and the distance between the outer surfaces of the guide rail and the facing surfaces is kept the same as the distance of the clearance while attaching the seal device to the slider which is attached to the guide rail.

The seal device of the present invention has positioning parts which are provided at the seal device and which contact the outer surfaces of the guide rail when attached to the slider and prevent the guide rail from contacting with the seal device and can be attached while maintaining the distance of the clearance between the guide rail and the seal device the same as a predetermined distance. For this reason, it is possible to position the seal device without scratching the guide rail and without using a specialized positioning fixture.

Further, the linear guide device of the present invention is obtained by attaching the seal devices of the present invention, so when attaching the seal devices to the slider, the seal devices can be positioned without scratching the guide rail and without using a specialized positioning fixture. Further, it is possible to obtain low dust product and maintain good operability.

DESCRIPTION OF EMBODIMENTS

Figure 1:
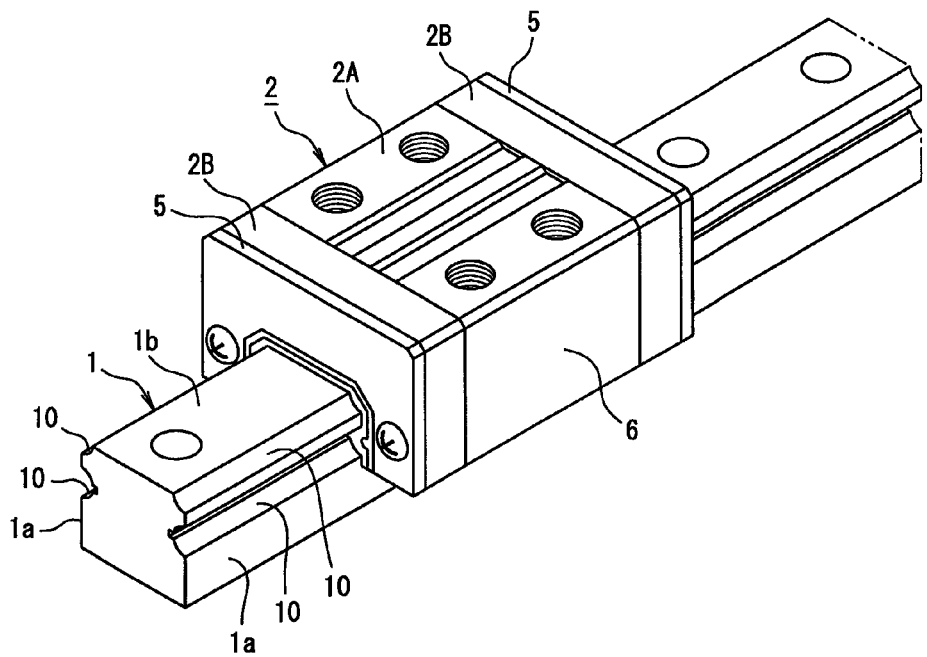
FIG. 1 is a perspective view which shows the structure of a linear guide device which is provided with a seal device of a first embodiment.

Embodiments of a seal device and linear guide device according to the present invention will be explained in detail while referring to the drawings.

First Embodiment

A first embodiment of the present invention will be explained below.

Figure 2:
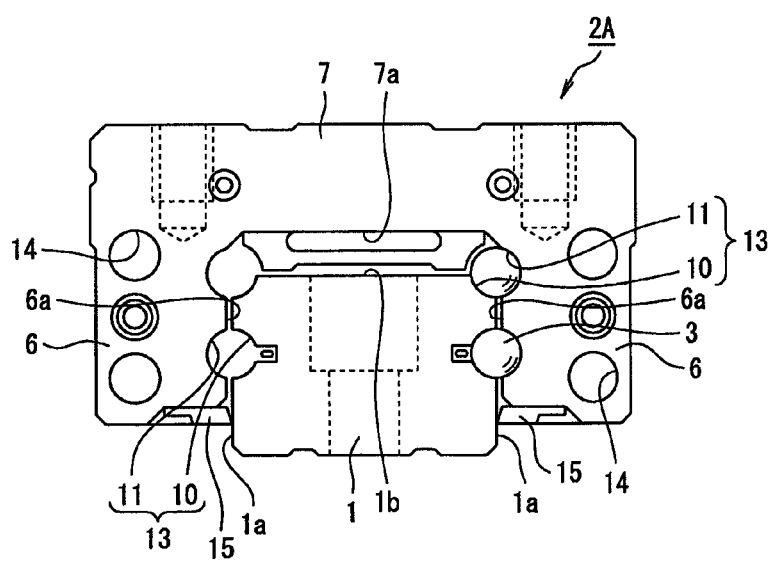
FIG. 2 is a cross-sectional view of the linear guide device of FIG. 1 as seen from an axial direction.

FIG. 1 is a perspective view which shows the structure of one embodiment of a linear guide device which is provided with a seal device according to the present invention. FIG. 2 is a cross-sectional view of the linear guide device of FIG. 1 as seen from an axial direction. Note that, in these and the following figures, the same or corresponding parts are assigned the same reference numerals.

A substantially cross-sectional rectangular shaped guide rail 1 which extends in the axial direction has a substantially cross-sectional U-shaped slider 2 attached to it movably in the axial direction. Note that, these cross-sections are cross-sections cut along the plane perpendicular to the axial direction. The substantially cross-sectional rectangular shaped guide rail 1 has, as outer surfaces, two end faces in the axial direction and four surfaces extending along the axial direction. On the other hand, the slider 2 is comprised of a plate-shaped part 7 from the two sides of which sleeve parts 6, 6 extend in the same direction. The plate-shaped part 7 and the two sleeve parts 6, 6 are perpendicular to each other, so the cross-sectional shape of the slider 2 is a substantially U-shape. Further, the inner surfaces of the slider 2 are comprised of the inner surface 7a of the plate-shaped part 7 and the inner surfaces 6a, 6a of the two sleeve parts 6, 6. The cross-sectional shape of the inner surfaces of the slider 2 is a shape corresponding to the cross-sectional shape of the outer surfaces of the guide rail 1.

In the slider 2 which is attached to the guide rail 1, among the inner surfaces, the inner surface 7a of the plate-shaped part 7 faces one surface 1b of the above four surfaces of the guide rail 1, and the inner surfaces 6a, 6a of the two sleeve parts 6, 6 face the two surfaces 1a, 1a adjoining the one surface 1b. In the present invention, the surface 1b which faces the inner surface 7a of the plate-shaped part 7 is referred to as the "top surface" of the guide rail 1, the surfaces 1a which face the inner surfaces 6a of the sleeve parts 6 are referred to as the "side surfaces" of the guide rail 1, and the surface parallel with the top surface 1b in the above four surfaces of the guide rail 1 is referred to as the "bottom surface". Further, in the present invention, when viewing the linear guide device from the axial direction end part side, the two sides symmetrical about the center axis of the guide rail 1 are referred to as the "left" and "right".

At the ridge parts where the top surface 1b of the guide rail 1 and the left and right side surfaces 1a, 1a intersect, rolling element rolling grooves 10, 10 are formed which are comprised of concaved grooves of substantially cross-sectional ¼ arc shapes which extend in the axial direction. Further, at intermediate positions of the vertical directions of the left and right side surfaces 1a, 1a of the guide rail 1, rolling element rolling grooves 10, 10 are formed which are comprised of concaved grooves of substantially cross-sectional semicircular shapes which extend in the axial direction.

Further, the slider 2 is comprised of a slider body 2A and end caps 2B, 2B which are detachably attached to the two end parts in the axial direction. Furthermore, the two end parts of the slider 2 in the axial direction (end faces of end caps 2B) have end seals 5, 5 attached to them, which seal the opening parts facing the axial direction in the opening parts of the spaces which are formed between the guide rail 1 and the slider 2. Furthermore, near the bottom most parts of the inner surfaces 6a, 6a of the two sleeve parts 6, 6 of the slider 2 which face the side surfaces 1a, 1a of the guide rail 1, under seals 15 are attached which seal the downward facing opening parts of the opening parts of the spaces (opening parts of spaces which are formed between the side surfaces 1a of the guide rail 1 and the inner surfaces 6a of the sleeve parts 6 of the slider 2 facing the same). These end seals 5, 5 and under seals 15 prevent entry of foreign matter from the outside into the spaces, discharge of dust produced inside of the slider 2 to the outside, and leakage of lubricant from the spaces to the outside. Note that, the end seals 5 and the under seals 15 correspond to seal devices which are the constituent element of the present invention.

Furthermore, the inner surfaces 6a, 6a of the left and right sleeve parts 6, 6 of the slider body 2A are formed with rolling element rolling grooves 11, 11, 11, 11 which are comprised of substantially cross-sectional semicircular concaved grooves which face the rolling element rolling grooves 10, 10, 10, 10 of the guide rail 1. Further, between the rolling element rolling grooves 10, 10, 10, 10 of the guide rail 1 and the rolling element rolling grooves 11, 11, 11, 11 of the slider 2, substantially cross-sectional circular rolling element rolling channels 13, 13, 13, 13 are formed. These rolling element rolling channels 13 extend in the axial direction. Note that, the numbers of the rolling element rolling grooves 10 and 11 which the guide rail 1 and slider 2 are provided with are not limited to two grooves per side. For example, one groove or three or more grooves per side is also possible. Further, the cross-sectional shapes of the rolling element rolling grooves 10 and 11, as explained above, may be arc shapes comprised of single arcs, but may also be substantially V-shapes comprised of combinations of two arcs with different centers of curvature (gothic arc shaped grooves).

Inside these rolling element rolling channels 13, large numbers of rolling elements 3 are rollably loaded. Through rolling of these rolling elements 3, the slider 2 is designed to move along the guide rail 1 in the axial direction. Note that, the type of the rolling elements is not limited to balls. Rollers can also be used as rolling elements. Further, spacers may also be interposed between the rolling elements 3.

Furthermore, the slider 2 is provided at the top and bottom parts of the thick parts of the left and right sleeve parts 6, 6 of the slider body 2A with linear channels 14, 14, 14, 14 comprised of substantially cross-sectional circular through holes which run along the axial direction parallel to the rolling element rolling channels 13.

On the other hand, the end caps 2B and 2B are, for example, comprised of injection molded parts of plastic materials and are formed into substantially U-shaped planar shapes. Further, at the two left and right sides of the back surfaces of the end caps 2B, 2B (surfaces abutting against slider body 2A), substantially cross-sectional circular semi-donut shaped curved channels (not shown) are formed in two stages at the top and bottom. If attaching these end caps 2B, 2B to the slider body 2A, the curved channels connect the rolling element rolling channels 13 and linear channels 14. These linear channels 14 and the two end curved channels form the rolling element return channels which send the rolling elements 3 from the end points to the starting points of the rolling element rolling channels 13. The rolling element rolling channels 13 and the rolling element return channels form substantially ring-shaped rolling element recirculation channels at the two left and right sides sandwiching the guide rail 1.

If the slider 2 which is attached to the guide rail 1 moves along the guide rail 1 in the axial direction, the rolling elements 3 which are loaded in the rolling element rolling channels 13 roll inside of the rolling element rolling channels 13 while moving with respect to the guide rail 1 in the same direction as the slider 2. Further, when the rolling elements 3 reach the end points of the rolling element rolling channels 13, they are scooped up from the rolling element rolling channels 13 and sent to the curved channels. The rolling elements 3 which enter the curved channels make a U-turn and are introduced into the linear channels 14, pass through the linear channels 14, and reach the curved channels at the opposite side. There, they again make a U-turn to return to the starting points of the rolling element rolling channels 13 and thereby endlessly repeatedly recirculate inside the rolling element recirculation channels.

Figure 3:
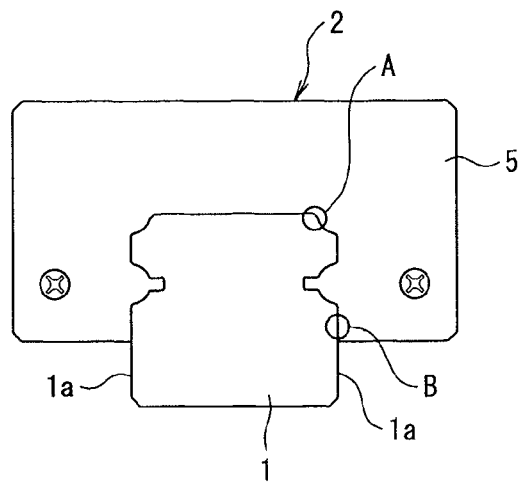
FIG. 3 is a front view of the linear guide device of FIG. 1 as seen from an axial direction.
Figure 4:
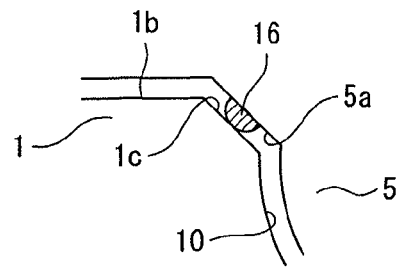
FIG. 4 is an enlarged view of a part A in FIG. 3.
Figure 5:
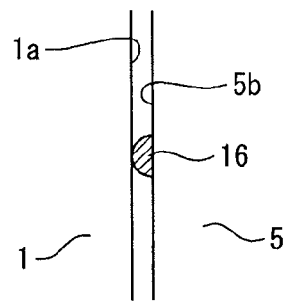
FIG. 5 is an enlarged view of a part B in FIG. 3.

The linear guide device of the above configuration is provided with the above-mentioned end seals 5. The end seals 5 will be explained while referring to FIGS. 3 to 5. FIG. 3 is a front view of the linear guide device of FIG. 1 to which the seal devices of the present embodiment are attached as seen from the axial direction. FIG. 4 is a view which shows enlarged the part A surrounded by the circle in FIG. 3. Further, FIG. 5 is a view which shows enlarged the part B surrounded by the circle in FIG. 3.

The end seals 5, like the end caps 2B, are formed in substantially cross-sectional U-shapes. Further, the end seals 5 are formed with through holes which pass through the end seals 5 in the axial direction of the guide rail 1. The end seals 5 are attached to the two end parts of the slider 2 in the axial direction (end faces of end caps 2B) by mounting screws (not shown) passed through the through holes.

The end seals 5 are noncontact type seal devices which are comprised of a thermoplastic plastic or other plastic. That is, the end seals 5 are attached to the outer surfaces of the guide rail 1 (top surface 1b and two side surfaces 1a, 1a) so as to face them across a clearance of a predetermined distance and seal the opening parts of the spaces formed between the guide rail 1 and the slider 2. The end seals 5 are noncontact type seal devices since the outer surfaces of the guide rail 1 and the facing surfaces of the end seals 5 facing them do not contact each other.

Further, the facing surfaces of the end seals 5 which face the outer surfaces of the guide rail 1 are provided with positioning members 16 which are comprised of projections which project out from the facing surfaces toward the outer surfaces of the guide rail 1 and have a projecting length from the facing surfaces the same as the distance of the clearance and slidingly contact the outer surfaces of the guide rail 1. Note that, the positioning members 16 correspond to the positioning parts which are the constituent element of the present invention.

That is, the end seals 5 are formed with surfaces 5a, 5a which face ridge parts 1c, 1c where the top surface 1b of the guide rail 1 and the rolling element rolling grooves 10, 10 intersect when attached to the two end parts of the slider 2 in the axial direction (end faces of end caps 2B). Further, the end seals 5 are formed with surfaces 5b, 5b which face the two left and right side surfaces 1a, 1a of the guide rail 1 when attached to the two end parts of the slider 2 in the axial direction (end faces of end caps 2B).

Further, the end seals 5 are provided with positioning members 16 at surfaces 5a, 5a which face the ridge parts 1c, 1c and surfaces 5b, 5b which face the two left and right side surfaces 1a, 1a of the guide rail 1. Note that, the positions where the positioning members 16 are arranged are not limited to the above positions. They can be provided so as to slidingly contact the outer surfaces of the guide rail 1 other than at the rolling element rolling grooves 10 where scratching could have a detrimental effect on the relative movement of the slider 2 in the axial direction or than the top surface 1b of the guide rail 1 where scratches would stand out.

Further, the number of the positioning members 16 which are provided at the end seals 5 is not particularly limited, but it is preferable to provide a plurality for suitably positioning the end seals 5 in the vertical and horizontal directions. For example, the positioning members 16 for positioning the end seals 5 in the vertical direction are preferably provided at the surfaces 5a, 5a which face the ridge parts 1c, 1c as explained above, while the positioning members 16 for positioning the end seals 5 in the horizontal direction are preferably provided at the surfaces 5b, 5b which face the left and right side surfaces 1a, 1a of the guide rail 1.

Furthermore, the material of the positioning members 16 is not particularly limited so long as not damaging the outer surfaces of the guide 1 by contact and not obstructing relative movement of the slider 2 in the axial direction. As the material of the positioning members 16, preferably a plastic, more preferably a thermoplastic plastic, rubber, etc. may be used.

Furthermore, the positioning members 16 may also be integrally formed with the end seals 5. Separate positioning members 16 may also be attached to the facing surfaces of the end seals 5 by bonding or other commonly used fastening methods.

Furthermore, when the end seals 5 and the positioning members 16 are the same material, integral formation is preferable, but even when the end seals 5 and the positioning members 16 are the same material, they need not be integrally formed. Separate members may also be joined. Further, the end seals 5 may be comprised of a plastic or may be comprised of a metal.

Since the end seals 5 are provided with such positioning members 16, when producing the linear guide device, it is possible to prevent the inner surfaces of the end seals 5 from contacting the outer surfaces of the guide rail 1 and damaging them. That is, when attaching the end seals 5 to the slider 2 which is attached to the guide rail 1, the positioning members 16 contact the outer surfaces of the guide rail 1 to prevent the outer surfaces of the guide rail 1 from contacting with inner surfaces (facing surfaces) of the end seals 5 facing them.

Further, when attaching the end seals 5 to the slider 2, the positioning members 16 which are provided at the surfaces 5a, 5a which face the ridge parts 1c, 1c can be used for positioning in the vertical direction, while the positioning members 16 which are provided at the surfaces 5b, 5b which face the two left and right side surfaces 1a, 1a of the guide rail 1 can be used for positioning in the horizontal direction. Due to this, it becomes possible to position the end seals 5 with respect to the outer surfaces of the guide rail 1 and attach the end seals 5 to the slider 2 without using shims or other specialized positioning fixtures. Note that, it is also possible to attach the end seals 5 to the slider 2, then remove the positioning members 16.

Further, the projecting length of the positioning members 16 which are provided at the end seals 5 of the present embodiment from the facing surfaces is the same as the distance of the clearance between the guide rail 1 and the end seals 5. Due to this, if attaching the end seals 5 to the slider 2 so that the front ends of the positioning members 16 contact the outer surfaces of the guide rail 1, it becomes possible to attach the end seals 5 to the slider 2 so that the clearance between the outer surfaces of the guide rail 1 and the facing surfaces of the end seals 5 becomes the same as the distance of the clearance without using shims or other specialized positioning fixtures.

Furthermore, according to the end seals 5 of the present embodiment, the guide rail 1 is contacted by only the positioning members 16. The end seals 5 do not contact the guide rail 1, so the end seals 5 are not liable to slide against the outer surfaces of the guide rail 1 and increase the frictional resistance. Further, according to the end seals 5 of the present embodiment, it is possible to suppress production of dust due to sliding, so it becomes possible to realize lower dust production.

Further, the positioning members 16 which are provided at the end seals 5 of the present embodiment are made of plastic, so even if contacting the outer surfaces of the guide rail 1, do not easily scratch the guide rail 1 and do not easily obstruct relative movement of the slider 2 in the axial direction. Further, even if the positioning members 16 become worn and deform, since the end seals 5 themselves are fastened to the slider 2 by screws etc., it becomes possible to maintain the initial positions.

Second Embodiment

Figure 7:
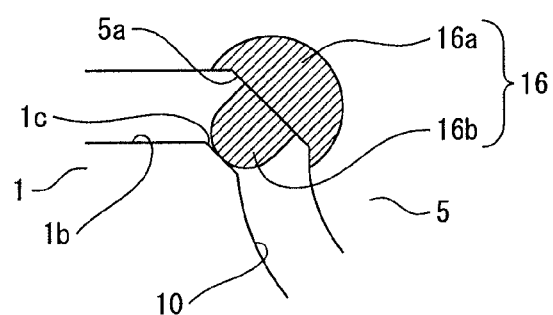
FIG. 7 is an enlarged view of a part C in FIG. 6.
Figure 8:
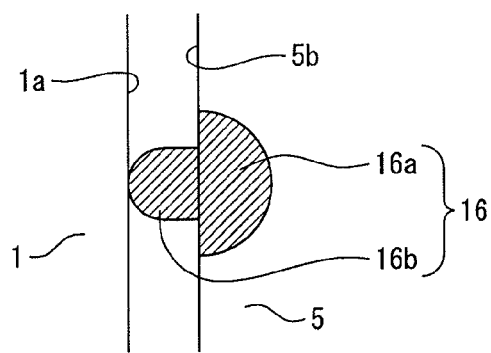
FIG. 8 is an enlarged view of a part D in FIG. 6.

Next, a second embodiment of the present invention will be explained with reference to FIG. 6 to FIG. 8. Note that, the constitution and actions and effects of the linear guide device of the second embodiment are substantially similar to those of the linear guide device of the first embodiment, so only the different parts will be explained and explanations of similar parts will be omitted.

Figure 6:
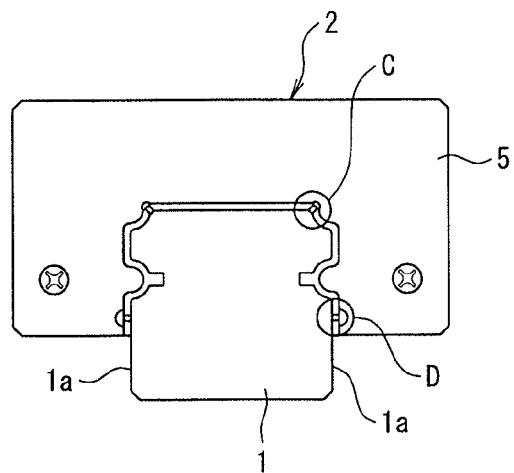
FIG. 6 is a front view of a linear guide device which is provided with a seal device of a second embodiment as seen from an axial direction.

FIG. 6 is a front view of a linear guide device which is provided with a seal device of the present embodiment as seen from an axial direction. FIG. 7 is a view which shows enlarged the part C which is surrounded by the circle in FIG. 6. Further, FIG. 8 is a view which shows enlarged the part D in FIG. 6.

The facing surfaces of the end seals 5 which face the outer surfaces of the guide rail 1 are provided by insert molding with projections 16b which stick out from the facing surfaces toward the outer surfaces of the guide rail 1 and have a projecting length from the facing surfaces which is the same as the distance of the clearance and slidably contact the outer surfaces of the guide rail 1.

That is, when the end seals 5 are for example made of metal, the metal end seals 5 can be used as inserts for insert molding to provide plastic positioning members 16 at the facing surfaces of the end seals 5. The positioning members 16 which are formed by insert molding are comprised of base parts 16a and projections 16b which stick out from the outer surfaces of the base parts 16a. The positioning members 16 are formed by insert molding so that the projections 16b stick out from the holes which are formed in the facing surfaces of the end seals 5 to the outside of the end seal 5 and the base parts 16a continued to the projections 16b are arranged inside of the end seals 5. The projections 16b of the positioning members 16 correspond to the positioning parts which are the constituent element of the present invention.

The method of providing positioning members 16 at the end seals 5 is not particularly limited so long as the positioning members 16 are attached to the end seals 5. As the method of providing positioning members 16 at the end seals 5, the method of using a binder to bond the positioning members 16 to the end seals 5 through the base parts 16a, the method of insert molding the positioning members 16, etc. may be used. Due to this, the end seals 5 can be provided with projections 16b.

According to the end seals 5 of the present embodiment, it is possible to make the end seals 5 and the positioning members 16 different materials. Due to this, even if the end seals 5 are, for example, made of a metal or other such material which would easily scratch the guide rail 1, when attaching the end seals 5 to the slider 2, the positioning members 16 contact the guide rail 1, so the guide rail 1 and the end seals can be positioned, without contact, so that the clearance between the guide rail 1 and the end seals 5 becomes the same as the distance of the clearance. Note that, it is also possible to attach the end seals 5 to the slider 2, then remove the positioning members 16.

Third Embodiment

Next, a third embodiment of the present invention will be explained with reference to FIGS. 9 and 10.

Note that, the configuration and action and effect of the linear guide of the third embodiment are substantially the same as the linear guide device of the first embodiment, so only the different parts will be explained and the explanation of similar parts will be omitted.

Figure 9:
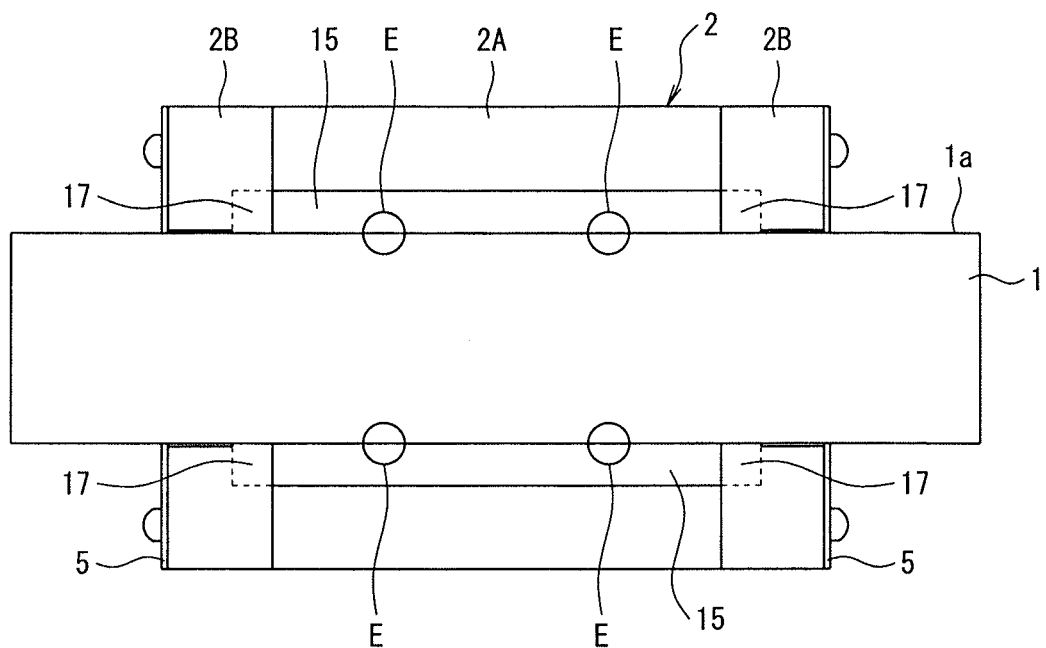
FIG. 9 is a front view of a linear guide device which is provided with a seal device of a third embodiment as seen from a bottom surface direction.
Figure 10:
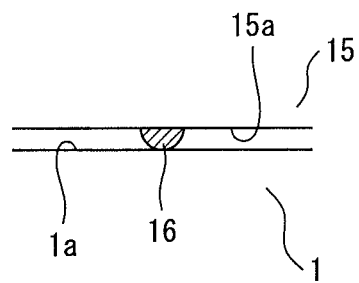
FIG. 10 is an enlarged view of a part E in FIG. 9.

FIG. 9 is a view of a linear guide device which mounts seal devices of the present embodiment as seen from the bottom surface direction. FIG. 10 is a view which shows enlarged a part E which is surrounded by the circle in FIG. 9.

The linear guide device of the above such configuration is provided with the above-mentioned under seals 15. This under seals 15 are attached to the slider 2 along the axial direction so as to face the outer surfaces of the guide rail 1 (side surfaces 1a, 1a) across a clearance of a predetermined distance and seals opening parts of the spaces which are formed between the guide rail 1 and the slider 2. The under seals 15 are noncontact type seal devices since the outer surfaces of the guide rail 1 and the facing surfaces 15a of the under seals 15 facing them do not contact.

The method of attaching the under seals 15 to the slider 2 is not particularly limited, but in the present embodiment, they are attached to the slider 2 by having the two end parts in the axial direction held by under seal fastening parts 17 which are provided at the two end caps 2B, 2B. At this time, the under seals 15 are held to be able to move in the horizontal direction. The structure of the under seal fastening parts 17 is not particularly limited so long as it is possible to fasten and hold the under seals 15, but, for example, slits may be used. By engaging the two end parts of the under seals 15 in the axial direction to the slit-shaped under seal fastening parts 17 which are formed at the two end caps 2B, 2B, the under seals 15 are held at the two end caps 2B, 2B.

Further, the facing surfaces 15a of the under seals 15 which face the outer surfaces of the guide rail 1 are provided with positioning members 16 which are comprised of projections which stick out from the facing surfaces 15a to the outer surfaces of the guide rail 1 and have a projecting length from the facing surfaces 15a which is the same as the distance of the clearance and which slidingly contact the outer surfaces of the guide rail 1. The positioning members 16 correspond to the positioning parts which are the constituent element of the present invention.

Note that, the positions at which the positioning members 16 are arranged are not limited to the above positions. The members can also be provided so as to slidingly contact the outer surfaces of the guide rail 1 (side surfaces 1a) other than the rolling element rolling grooves 10 where it is believed scratching would cause a detrimental effect on relative movement of the slider 2 in the axial direction.

Further, the number of the positioning members 16 which are provided at the under seal 15 is not particularly limited, but a plurality are preferably provided to enable suitable positioning of the under seals 15. For example, it is preferable to provide them at a plurality of axial direction positions (for example, near the two end parts in the axial direction) of the facing surfaces 15a of the under seals 15.

Furthermore, the material of the positioning members 16 is not particularly limited so long as not inflicting damage to the outer surfaces of the guide rail 1 by contact and not obstructing relative movement of the slider 2 in the axial direction. The material of the positioning members 16 is preferably a plastic, more preferably a thermoplastic plastic, rubber, etc.

Furthermore, the positioning members 16 may be formed integrally with the under seals 15. Separate positioning members 16 may also be attached to the facing surfaces 15a of the under seals 15 by bonding or other commonly used fastening method.

Furthermore, when the under seals 15 and the positioning members 16 are the same material, they are preferably integrally formed, but even when the under seals 15 and the positioning members 16 are the same material, they need not be integrally formed. Separate members may also be joined. Further, the under seals 15 may be comprised of a plastic or may be comprised of a metal. Further, even when comprised of a plastic, a core metal which is comprised of a metal etc. may also be provided.

Since the under seals 15 are provided with such positioning members 16, when producing the linear guide device, it is therefore possible to prevent the facing surfaces 15a of the under seals 15 from contacting the outer surfaces of the guide rail 1 and causing damage. That is, when attaching the under seals 15 to the slider 2 which is attached to the guide rail 1, the positioning members 16 contact the outer surfaces of the guide rail 1 to prevent the outer surfaces of the guide rail 1 from contacting with the facing surfaces 15a of the under seals 15 facing the same.

Further, when attaching the under seals 15 to the slider 2, the positioning members 16 which are provided at the facing surfaces 15a may be used for positioning in the horizontal direction. Due to this, it becomes possible to position the under seals 15 with respect to the outer surface of the guide rail 1 and attach the under seals 15 to the slider 2 without using shims or other specialized positioning fixtures. Note that, it is also possible to attach the under seals 15 to the slider 2, then remove the positioning members 16.

Further, the projecting length from the facing surfaces 15a of the positioning members 16 which are provided at the under seals 15 of the present embodiment is the same as the distance of the clearance between the guide rail 1 and the under seals 15. Due to this, if attaching the under seals 15 to the slider 2 so that the front ends of the positioning members 16 contact the outer surfaces of the guide rail 1, it becomes possible to attach the under seals 15 to the slider 2 so that the clearance between the outer surfaces of the guide rail 1 and the facing surfaces 15a of the under seals 15 becomes the same as the distance of the clearance without using shims or other specialized positioning fixtures.

Furthermore, according to the under seals 15 of the present embodiment, the guide rail 1 is contacted by only the positioning members 16. The under seals 15 do not contact the guide rail 1, so the under seals 15 are not liable to slide against the outer surfaces of the guide rail 1 and increase the frictional resistance. Further, according to the under seals 15 of the present embodiment, it is possible to suppress dust production due to sliding, so it becomes possible to realize lower dust production.

Further, the positioning members 16 which are provided at the under seals 15 of the present embodiment are made of plastic, so even if contacting the outer surfaces of the guide rail 1, the guide rail 1 will not easily be damaged and relative movement of the slider 2 in the axial direction will not easily be obstructed. Further, even if the positioning members 16 become worn and deform, the under seals 15 themselves are fastened by screws etc. to the slider 2, so it becomes possible to maintain the initial positions.

REFERENCE SIGNS LIST 1 guide rail
1a side surface
1b top surface
2 slider
2A slider body
2B end cap 5 end seal
15 under seal
16 positioning member
16a base part
16b projection

The invention claimed is:

1. A noncontact type seal device attached to a slider of a linear guide device with a clearance of a predetermined distance with respect to outer surfaces of a guide rail, the seal device sealing an opening part of a space which is formed between the guide rail and the slider, wherein
the linear guide device is provided with the guide rail extending in an axial direction and the slider attached to the guide rail in a manner enabling relative movement in the axial direction,
the seal device is provided with positioning parts which contact the outer surfaces of the guide rail to prevent the outer surfaces of the guide rail from contacting with the facing surfaces of the seal device which face the outer surfaces of the guide rail, when attaching the seal device to the slider which has been attached to the guide rail, and which maintain a distance between the outer surfaces of the guide rail and the facing surfaces the same as the distance of the clearance,
the positioning parts comprise projections which project out from the facing surfaces,
a length of a projection from the facing surfaces is same as the distance of the clearance, and
the seal device is a member attached to facing parts of the slider which face side surfaces of the guide rail having a substantially cross-sectional rectangular shape and sealing the opening part of the space which is formed between the side surfaces of the guide rail and the facing parts of the slider.

2. The seal device according to claim 1, wherein the seal device is a member attached to an end part of the slider in the axial direction and sealing the opening part which faces the axial direction of the space.

3. The seal device according to claim 1, wherein the positioning parts are made of a plastic.

4. The seal device according to claim 1, wherein end seals attached to the two end parts of the slider in the axial direction, which seal the opening parts facing the axial direction in the opening parts of the spaces which are formed between the guide rail and the slider, are formed with surfaces which face ridge parts where the top surface of the guide rail and rolling element rolling grooves intersect when attached to the two end parts of the slider in the axial direction, and are provided with positioning members for positioning the end seals in the vertical direction at surfaces which face the ridge parts.

5. The seal device according to claim 4, wherein end seals are formed with surfaces which face two left and right side surfaces of the guide rail when attached to the two end parts of the slider in the axial direction, and are provided with positioning members for positioning the end seals in the horizontal direction at surfaces which face the two left and right side surfaces.

6. The seal device according to claim 4, wherein the positioning members are comprised of base parts and projections which stick out from the outer surfaces of the base parts, and are formed by insert molding so that the projections stick out from the holes which are formed in the facing surfaces of the end seals to the outside of the end seal and the base parts continued to the projections are arranged inside of the end seals.

7. The seal device according to claim 4, wherein under seals are attached to the slider along the axial direction so as to face the outer surfaces of the guide rail across a clearance of a predetermined distance and seals opening parts of the spaces which are formed between the guide rail and the slider, and are noncontact type seal devices since the outer surfaces of the guide rail and the facing surfaces of the under seals facing the outer surfaces of the guide rails do not contact.

8. A linear guide device provided with a guide rail extending in an axial direction, a slider attached to the guide rail in a manner enabling relative movement in the axial direction, and a noncontact type seal device attached to the slider to face the outer surfaces of the guide rail with a clearance of a predetermined distance and sealing an opening part of a space which is formed between the guide rail and the slider, wherein
the seal device is provided with positioning parts which contact the outer surfaces of the guide rail to prevent the outer surfaces of the guide rail from contacting with the facing surfaces of the seal device which face the outer surfaces of the guide rail when attaching the seal device to the slider which has been attached to the guide rail and which maintain a distance between the outer surfaces of the guide rail and the facing surfaces same as the distance of the clearance,
the positioning parts comprise projections which project out from the facing surfaces,
a length of a projection from the facing surfaces is same as the distance of the clearance,
the positioning parts are in contact with the outer surfaces of the guide rail to prevent the outer surfaces of the guide rail from contacting with the facing surfaces of the seal device which face the outer surfaces of the guide rail,
the distance between the outer surfaces of the guide rail and the facing surfaces is kept same as the distance of the clearance while attaching the seal device to the slider which is attached to the guide rail, and
the seal device is a member attached to facing parts of the slider which face side surfaces of the guide rail having a substantially cross-sectional rectangular shape and sealing the opening part of the space which is formed between the side surfaces of the guide rail and the facing parts of the slider.

9. The linear guide device according to claim 8, characterized in that the positioning parts are made of a plastic.

* * * * *